Jan. 18, 1949.  A. P. STROM  2,459,600
COMPRESSED GAS CIRCUIT INTERRUPTER
Filed Dec. 14, 1944  6 Sheets—Sheet 1

WITNESSES:

INVENTOR
Albert P. Strom.
BY
ATTORNEY

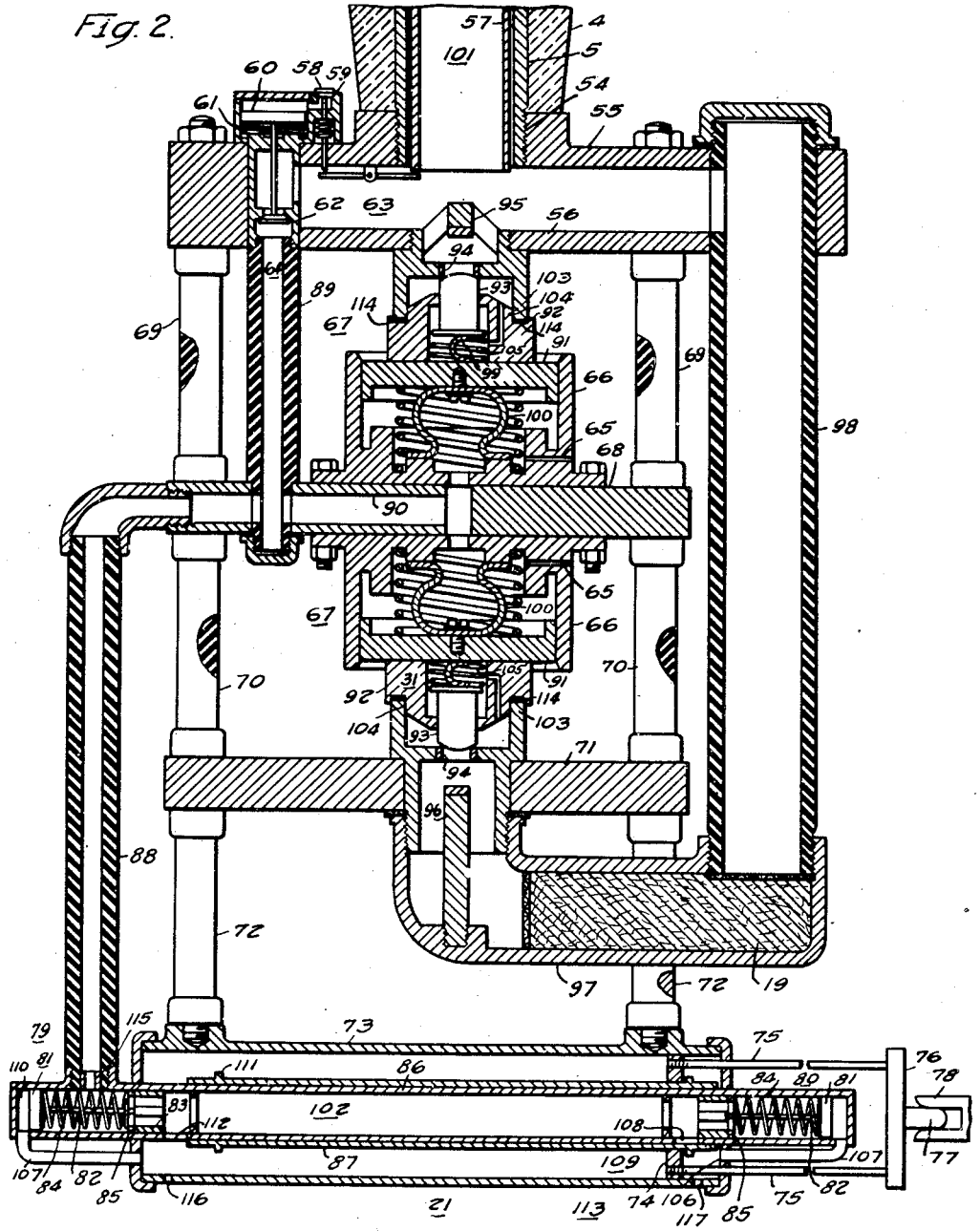

Jan. 18, 1949.  A. P. STROM  2,459,600
COMPRESSED GAS CIRCUIT INTERRUPTER
Filed Dec. 14, 1944  6 Sheets-Sheet 3
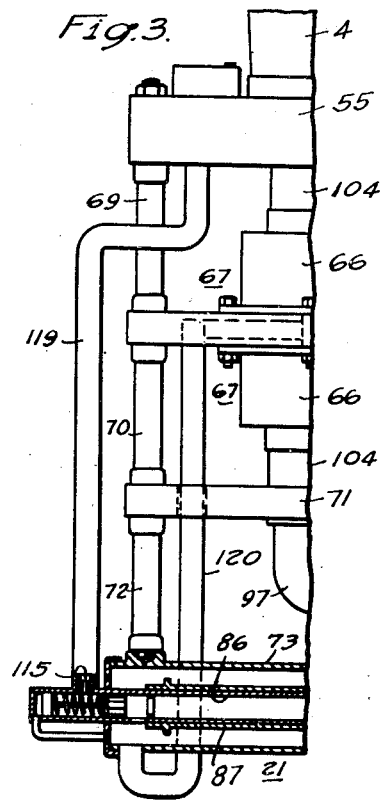
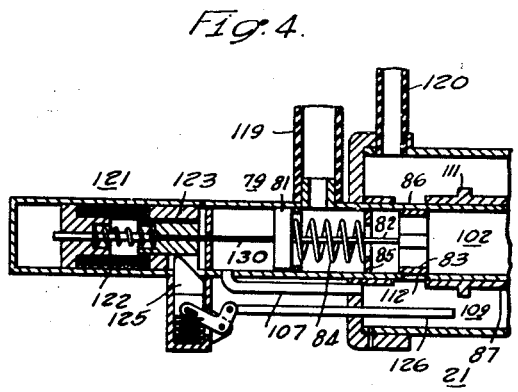
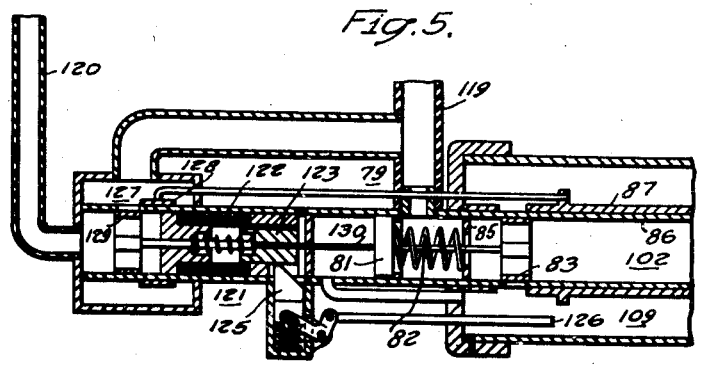
WITNESSES:
INVENTOR
Albert P. Strom.
BY
ATTORNEY Jan. 18, 1949.  A. P. STROM  2,459,600
COMPRESSED GAS CIRCUIT INTERRUPTER
Filed Dec. 14, 1944  6 Sheets-Sheet 4
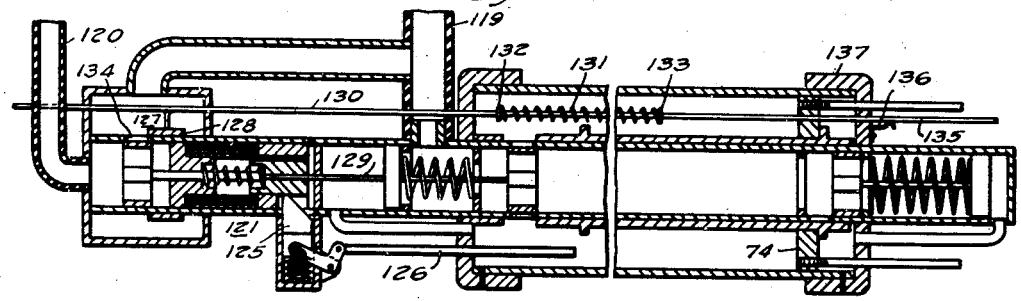
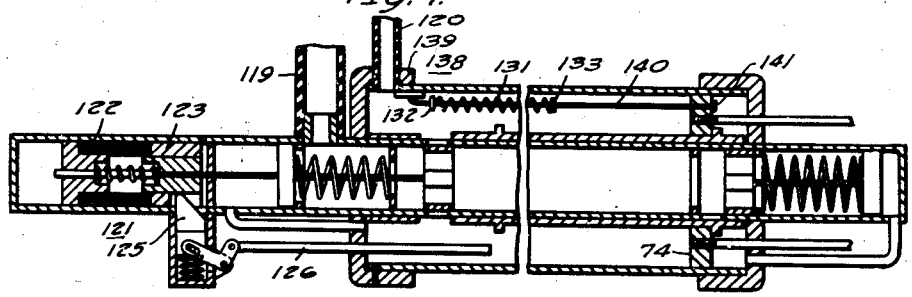
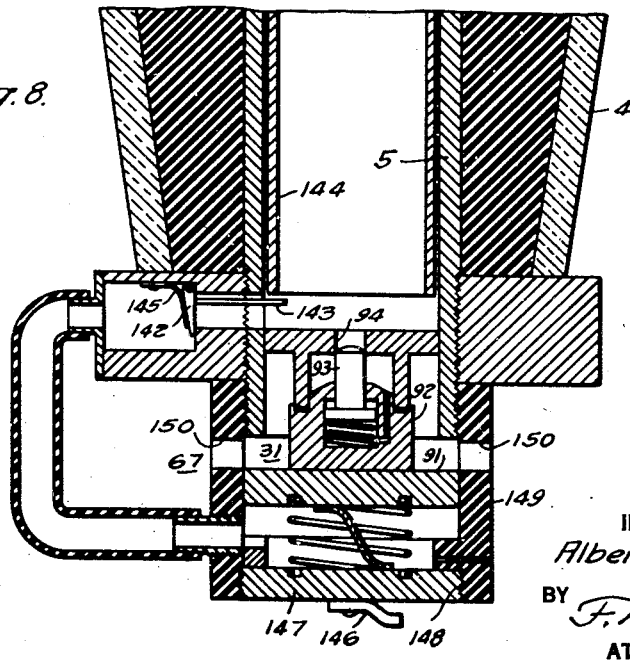
WITNESSES:
E. A. McCloskey
W. R. Crout
INVENTOR
Albert P. Strom.
BY
ATTORNEY Jan. 18, 1949.  A. P. STROM  2,459,600
COMPRESSED GAS CIRCUIT INTERRUPTER
Filed Dec. 14, 1944  6 Sheets-Sheet 5
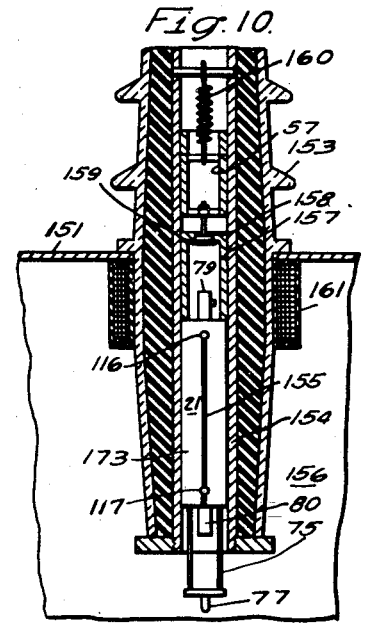
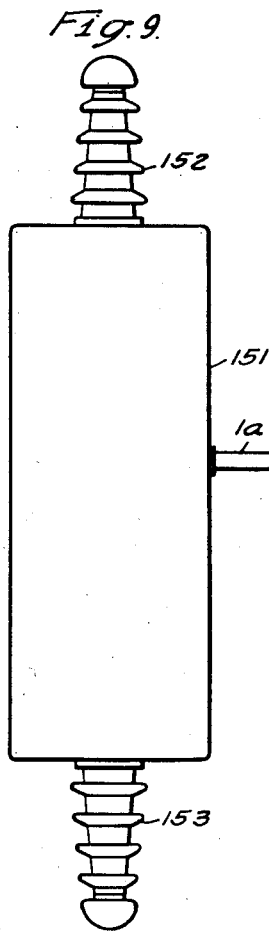
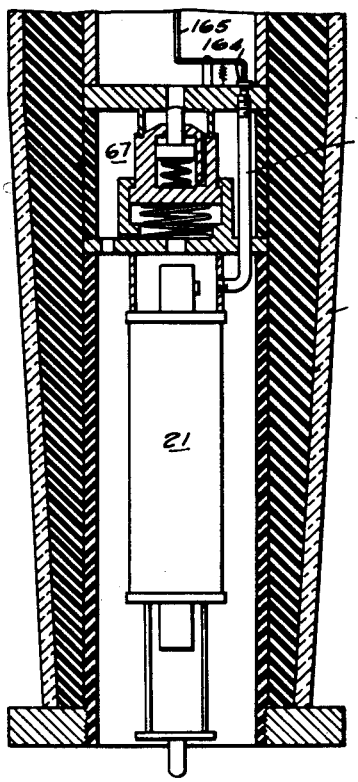
WITNESSES:
E. A. McCloskey
W. R. Crout
INVENTOR
Albert P. Strom
BY F. W. Lyle
ATTORNEY Jan. 18, 1949.  A. P. STROM  2,459,600
COMPRESSED GAS CIRCUIT INTERRUPTER
Filed Dec. 14, 1944  6 Sheets-Sheet 6

WITNESSES:
E. A. M:Closkey
W. R. Crout

INVENTOR
Albert P. Strom.
BY F. W. Lyle.
ATTORNEY

Patented Jan. 18, 1949

2,459,600

UNITED STATES PATENT OFFICE 2,459,600

COMPRESSED GAS CIRCUIT INTERRUPTER

Albert P. Strom, Forest Hills, Pa., assignor to Westinghouse Electric Corporation, East Pittsburgh, Pa., a corporation of Pennsylvania Application December 14, 1944, Serial No. 568,104

18 Claims. (Cl. 200—148)

This invention relates to circuit interrupters in general, and more particularly to arc extinguishing structures therefor.

In United States patent application, filed November 28, 1944, Serial No. 565,456, by Leon R. Ludwig and Benjamin P. Baker, and assigned to the assignee of the instant application, there is shown and described a novel compressed air circuit interrupter comprising a pressurized chamber into which a pair of condenser bushings extend, having secured to their lower ends serially related arc extinguishing units. A movable conducting bridging member electrically interconnects the units in the closed circuit position. An object of my invention is to provide improvements in the interrupting structure set forth in the aforementioned patent application.

A general object of my invention is to provide a circuit interrupter of improved construction which will more effectively interrupt the circuit therethrough than has heretofore been achieved.

A more specific object is to provide an improved circuit interrupter of the gas-blast type comprising a pressurized chamber into which extend bushing means having contact means associated therewith. Preferably I provide electromagnetic means disposed interiorly of the bushing means to assist in actuating the contact means.

Another object is to provide an improved gas blast circuit interrupter in which a pressurized chamber is utilized, and to dispose disconnect means within the chamber actuated by the pressurized gas contained within the chamber.

A further object is to provide a novel contact structure adjacent one end of a condenser bushing extending into a pressurized chamber. Preferably, the contact structure comprises a plurality of arc extinguishing units disposed in serial relation and simultaneously actuated by venting the back sides of a plurality of pistons carrying the contacts through the condenser bushing.

Another object is to provide an improved construction for disconnect means especially adapted for positioning in a pressurized chamber, forming a part of a circuit interrupter of the gas-blast type.

Another object of my invention is to provide an improved compressed gas circuit interrupter comprising a pressurized chamber into which a pair of bushings extend, one of the bushings containing the interrupting structure and the other bushing containing suitable disconnect means.

Further objects and advantages will readily become apparent upon a reading of the following specification, taken in conjunction with the drawings, in which:

Fig. 2 is a fragmentary portion of a modified type of circuit interrupter embodying my invention and shown in the closed circuit position;

Fig. 3 is a fragmentary elevational view, partly in section, of a modified type of interrupting structure;

Fig. 4 shows a modified type of disconnect structure which may be used in place of the disconnect structure shown in Fig. 3;

Fig. 5 shows a further form of disconnect structure;

Figs. 6 and 7 show further modified types of disconnect structures;

Fig. 8 shows a modified type of arc extinguishing unit in vertical section disposed at one end of a bushing, the contacts being shown in the closed circuit position;

Fig. 9 is an elevational view of a modified type of circuit interrupter embodying my invention;

Fig. 10 is a vertical sectional view through one of the bushings of Fig. 9 showing the disconnect structure positioned therein;

Fig. 12 is a fragmentary vertical sectional view through a modified type of bushing containing both the disconnect and interrupting structure.

Figure 1:
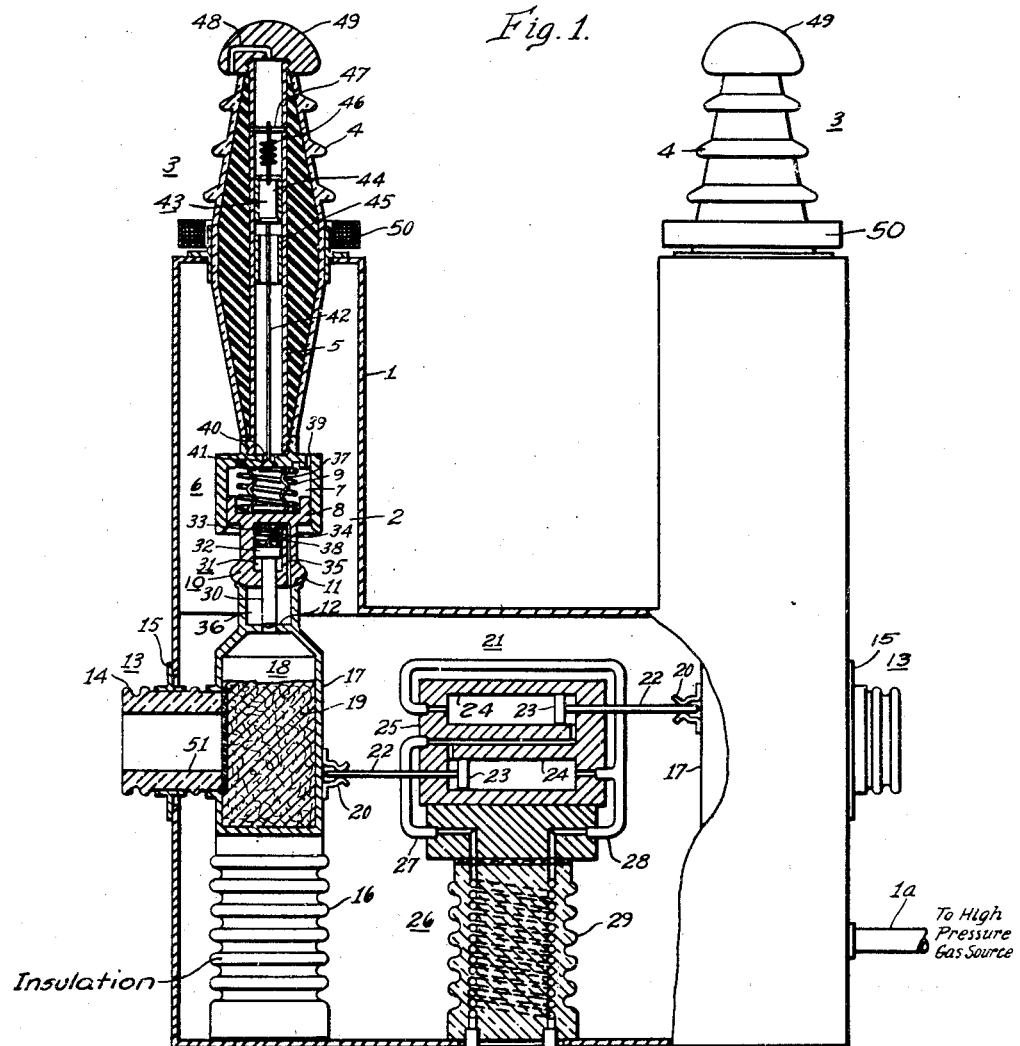
Figure 1 is a vertical sectional view through a circuit interrupter embodying my invention and shown in the closed circuit position.

Referring to the drawings and more particularly to Fig. 1 thereof, the reference numeral 1 designates a metal tank preferably at ground potential containing a suitable arc extinguishing gas 2 under pressure which may approach 300 pounds per square inch. The gas enters the tank 1 through the high pressure inlet 1a. Extending into the tank 1 are bushing means, generally designated by the reference numeral 3 and serving to conduct the terminal stud structure into the tank 1. In this instance the bushing means 3 comprises a porcelain bushing 4 which may be of the condenser type suitable for high voltage application. A terminal sleeve 5 extends through the bushing 4 and has threadedly secured at its lower end an arc extinguishing unit generally designated by the reference numeral 6. The contact means associated with the arc extinguishing unit 6 comprises a piston chamber 7 in which reciprocally operates a piston 8, spring-biased to its lower position by a compression spring 9, and carrying a blast valve 10 at its lower end which seats on an annular valve seat 11 carried by a stationary orifice-type contact 12, in turn carried by outlet means generally designated by the reference numeral 13. In this instance the outlet means 13 comprise a porcelain bushing 14 extending through a wall of the tank 1 and fixedly secured thereto by a flange 15, the latter being suitably secured as by welding to the wall of the tank 1.

A bushing support 16 also assists the bushing 14 in maintaining in proper position a cylindrically-shaped member 17 having the orifice-type contact 12 and the valve seat 11 disposed adjacent its upper end.

Preferably a portion of the region 18 within the member 17 contains a filter of metal screen or wool 19 to reduce flame and ionization. A stationary disconnect contact 20 is secured to the wall of the cylindrically shaped member 17 which forms a portion of the disconnect means, generally designated by the reference numeral 21, which are wholly disposed within the pressurized chamber 1.

Cooperating with the stationary disconnect contact 20 is a movable disconnect contact 22 having a piston 23 secured to its other end and movable within a piston chamber 24 defined by a conducting member 25.

Preferably independent conduit means, generally designated by the reference numeral 26, are provided for actuating the pistons 23 associated with the movable disconnect contacts 22. In this instance the independent conduit means 26 preferably comprises two conduits 27, 28 having portions formed helically within the bushing 29, which also helps support the disconnect means 21 within the chamber 1.

A movable contact 30 cooperates with the stationary orifice-type contact 12 to draw an arc, a lost-motion mechanical connection 31 being provided to interconnect the movable contact 30 and the blast valve 10. The lost-motion mechanical connection 31 includes a flange 32 secured to the upper end of the movable contact 30 and movable within a chamber 33 provided by the blast valve 10. A compression spring 34 is provided to bias the movable contact 30 in a downward direction as viewed in Fig. 1. An equalizing passage 35 is provided interconnecting the region 36 with the region in chamber 33, back of the flange 32, so that during the opening operation upward movement of the blast valve 10 takes place before separation of the contacts 12, 30.

Resilient connectors 37, 38 are provided to electrically interconnect the movable contact 30 with the piston chamber 7. A vent 39 is provided, the purpose for which will appear more fully hereinafter.

At the upper end of the piston chamber 7 is provided an aperture 40 controlled by a valve 41 operated by a rod 42 having the upper end thereof actuated by electromagnetic means generally designated by the reference numeral 43, and in this instance comprising a movable armature 44 of sleeve-like configuration and a stationary armature 45 also of sleeve-like configuration, both of the aforesaid armatures being disposed within the terminal sleeve 5 disposed interiorly of the bushing means 3.

The movable armature 44 is biased upwardly by a tension spring 46 having its upper end secured to a pin 47 extending across the terminal sleeve 5. A vent passage 48 extends through a terminal cap 49. An actuating coil 50 surrounds the bushing 4 and is at ground potential.

From the foregoing description it will be apparent that in the closed-circuit position, as shown in Fig. 1, the electrical circuit therethrough comprises terminal cap 49, terminal sleeve 5, piston chamber 7, resilient conductor 37, piston 8, resilient connector 38, movable contact 30, orifice-type stationary contact 12, member 17, stationary disconnect contact 20, movable disconnect contact 22, to the conducting member 25. The circuit then extends through the right-hand arc extinguishing unit 6 and the right-hand bushing means 3 in a like manner, to the right-hand terminal cap 49.

To effect an opening operation of the circuit interrupter, the actuating coil 50 at ground potential is energized to thereby cause downward movement of the movable armature 44 in opposition to the upward biasing action exerted by the tension spring 46. The downward movement of the movable armature 44 causes downward movement of the valve 41 to open the aperture 40, thus venting the back side of the piston 8 to atmosphere through the venting means provided in the bushing means 3 comprising the terminal sleeve 5 and vent passage 48. The gas 2 under pressure disposed within the chamber or tank 1 acts on the lower surface of the piston 8 to force the same upwardly against the downward biasing action exerted by the compression spring 9, the movable contact 30 meanwhile remaining in engagement with the stationary contact 12.

The upward movement of the piston 8 causes a separation between the blast valve 10 and the valve seat 11 to thereby permit high pressure gas 2 to flow into the region 36 adjacent the orifice type stationary contact 12.

After the blast valve 10 has moved upwardly a predetermined distance, the flange 32 is engaged in abutting relation by the lower end of the chamber 33 to thereby cause a forcible upward movement of the contact 30, thus drawing an arc between the movable contact 30 and the orifice-type stationary contact 12.

Figure 1A:
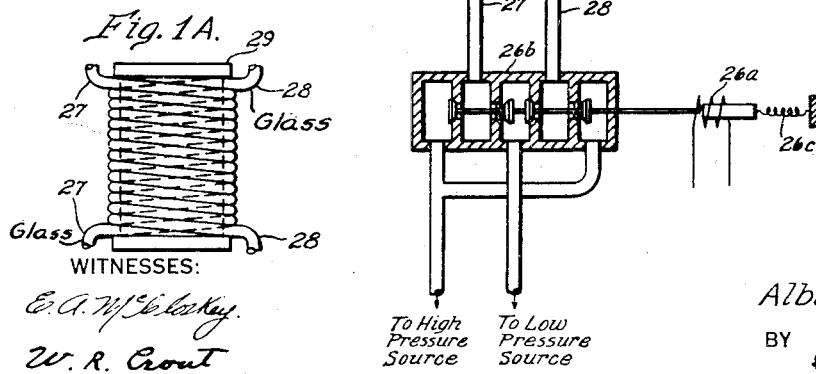
Fig. 1A is a fragmentary elevational view of a modified construction for leading gas conduits through the tank wall.

The pressurized gas 2 now flows from the region 36 through the stationary contact 12 extinguishing the arc drawn by the contacts 12, 30, and passing through the metal wool 19 and out through the bushing 14 to the region exteriorly of the tank 1. Following an interruption of the arc, the disconnect means 21 is opened by energizing solenoid 26a to actuate the valve means 26b. This causes differential pressure to exist in the tubes 27, 28 thereby causing opening motion of the pistons 23 and movable disconnect contacts 22. The helical portions of tubes 27, 28 formed in insulator 29 add dielectric strength to the tubes. By opening and closing the disconnect contacts by means of differential gas pressure, the pressure in both tubes is above atmospheric pressure and hence the dielectric strength of the gas in the tubes is increased. Fig. 1A shows an arrangement where the tubes 27, 28 are of glass or other insulating material and wound about the insulator 29. This construction lengthens the breakdown path along the tubes 27, 28.

From the foregoing description it will be apparent that my invention concerns a novel circuit interrupting structure of the gas-blast type wherein the breaker chamber may be filled at all times with compressed air or gas. The construction is such that the moving contact is located on the bushing 4 leaving compressed air up to within a few inches from the interrupting orifice 12. At the time the arc is drawn the compressed air is at the orifice since blast valve 10 is already opened. This practically eliminates all time delay in initiating the air blast. Also the moving contact 30 which is at high potential, may be controlled without material connections such as insulating rods thus eliminating the possibility of mechanical or electrical failure of such rods. Furthermore, the tank 1 may be "dead," that is, it is at ground potential and thus safe electrically in the presence of station attendants.

In the past, in the construction of high voltage air circuit breakers it has been customary to have atmospheric pressure in the breaker chamber up until the time of a breaker operation. Compressed air would then flow from a storage tank through a main blast valve (which is usually located several feet from the interrupter contacts for reasons of insulation) and thence through a hollow porcelain bushing to fill the breaker chamber. Several half cycles are required to build up the pressure in the breaker chamber. In the meantime, the contacts dare not be opened since: (1) there would be insufficient blast to quickly interrupt the arc, (2) the dielectric strength of the gas might be too low to prevent restriking of the arc.

In most present designs it is felt necessary to have only atmospheric pressure normally in the breaker since the breaker chamber is made of porcelain and it is not desirable to keep the porcelain under continuous high pressure. This difficulty is surmounted by the construction disclosed in Fig. 1 whereby the tank 1 is composed of metal and is at ground potential and bushings 4 are provided of the condenser type for high-voltage application. It is then safe to maintain the region within the tank 1 at a constant high pressure.

In the construction shown in Fig. 1 the air blast valve 10 and movable contact 30 are located on the end of the high voltage bushing 4 and on the inlet side of the interrupting orifice 12. Opening and closing of this valve and contact are accomplished remotely by means of a magnet coil 50 at ground potential surrounding the bushing 4.

When coil 50 is deenergized following an opening operation, the blast valve 10 and movable contact 30 reclose, but in the meantime the disconnect means 21 has been actuated to provide two isolating gaps into the circuit. The circuit is reclosed by deenergizing the solenoid 26a to permit the tension spring 26c to operate the valve means 26b thereby effecting closing movement of the pistons 23 connected to the movable disconnect contacts 22.

During interruption, gas is vented through the stationary orifice 12 into region 18 containing the filter 19 of metal screen or wool to reduce flame and ionization. The gas then escapes to atmosphere through the hollow insulating bushing 14. This bushing 14 can be relatively short inside the tank 1 since it is located in a compressed gas medium. The breakdown gap at atmospheric pressure is long since it extends from the inside of the breaker through the inner bore 51 of the bushing 14 and round the external end of the bushing 14 to the grounded tank 1.

The disconnect means 21 are supported on an insulating pedestal 29 within the compressed gas tank 1. Through this insulator, which is preferably of porcelain, are air passages, 27, 28 for operation of the disconnect contacts. These passages 27, 28 may be made longer than the bushing 29 itself by helical or other indirect path through the bushing 29 from one end thereof to the other in order to increase the breakdown voltage. This may be necessary or desirable, especially if the disconnect contacts were operated with one side at atmospheric pressure rather than with differential pressure above atmospheric pressure.

While it appears preferable to design the breaker to operate as a dead tank device as illustrated in Fig. 1, the valve and contact control scheme may also be used for live tank breakers, but in this case the operating coil 50 must be insulated from the tank or its circuit must be isolated from low potential circuits.

In the embodiment of my invention shown in Fig. 2, the bushing 4, mounted within a pressurized tank (not shown) similar to the tank 1 shown in Fig. 1, has the terminal sleeve 5 passing therethrough which threadedly supports at 54 a conducting support member 55 having a passage 56 provided therein. A sleeve-like movable armature 57, which is analogous to the movable armature 44 of Fig. 1, extends through the lower end of the bushing 4 and serves to cause opening of a pilot valve 58 when the coil 50 (not shown) surrounding the bushing 4 is energized. When the pilot valve 58 is open it permits high pressure gas 2 to pass through the aperture 59, controlled by pilot valve 58, to the top side of a piston 60 spring-biased to its upper position by a compression spring 61 and controlling a valve 62. The region 63 within the passage 56 is always at atmospheric pressure whereas the region 64 below the valve 62 is always at a high pressure, except during opening of the valve 62. High pressure gas 2 leaks through vent apertures 65 provided in the piston cylinders 66 associated with the two serially related arc extinguishing units 67 to maintain the region 64 at high pressure when valve 62 is closed.

A conducting support plate 68 separates the two units 67 and is supported by insulating rods 69 from the support member 55. Insulating rods 70 also space a conducting plate 71 from the conducting support plate 68. Conducting rods 72 space a disconnect cylinder 73 composed of a conducting material from the plate 71.

Movable within the disconnect cylinder 73 is an annular piston 74 carrying two conducting rods 75 connected externally of the cylinder 73 by a conducting bridge 76, the latter carrying a disconnect contact 77. The disconnect contact 77 cooperates in the closed circuit position as shown in Fig. 2 with a disconnect contact 78 actuating by a like mechanism comprising a disconnect cylinder 73 (not shown) which is positioned below the other bushing 4 (not shown) of the circuit interrupter.

A first valve means, generally designated by the reference numeral 79, is associated with the left-hand end of the disconnect cylinder 73, and a second valve means 80 is associated with the right-hand end of the disconnect cylinder 73. The first and second valve means 79, 80 comprise a piston 81 connected by a rod 82 to a sleeve valve 83 and biased away from the center of the disconnect cylinder 73 by a compression spring 84 having one end seated on the piston 81 and having the other end seated on an annular stop 85.

The pistons 81 move within an inner venting cylinder 86 around which slidably is movable a sleeve valve 87. A conduit 88 connects one end of the inner venting cylinder 86 with a conduit 89 leading to the valve 62.

The support plate 68 has a passage 90 therethrough communicating with the conduit 88 to permit the valve 62 to vent the back sides of pistons 91 carrying the blast valves 92 and movable contacts 93 of the two arc extinguishing units 67. Lost-motion connections 31 are provided as in Fig. 1 to permit opening of the blast valves 92 prior to the separation of the movable contacts 93 from the stationary orifice-type contacts 94. Arcing contact 95, 96 may be provided so that one terminal of the drawn arcs may be terminated thereat. The orifice 94, associated with the lower arc extinguishing unit 64 communicates by means of a conduit 97 to an insulating conduit 98, the latter leading to the passage 56.

From the foregoing description it is apparent that in the closed circuit position as shown in Fig. 2 the electrical circuit therethrough comprises terminal sleeve 5, support member 55, stationary contact 94, movable contact 93, connector 99, piston 91, connector 100, plate 68, connector 100, lower piston 91, connector 99, lower movable contact 93, lower stationary contact 94, metal plate 71, connecting rods 72, conducting disconnect cylinder 73, annular piston 74, conducting rods 75 to the disconnect contact 77. The circuit then extends through the disconnect contact 78 and through the interrupting structure associated with the other bushing 4 of the interrupter in like manner.

To effect an opening operation of the interrupter the actuating coil 50 is energized to cause downward movement of the movable armature sleeve 57 to thereby cause opening of the pilot valve 58. The opening of the pilot valve 58 permits high pressure gas 2 to pass through the aperture 59 to the top surface of the piston 60 thus forcing the piston 60 and valve 62 open against the upward biasing action of the compression spring 61.

The opening of the valve 62 permits a venting of the back sides of the pistons 91 to atmospheric pressure through the venting means 101 extending through the bushing 4. Also the opening of the valve 62 permits the region 102 within the inner venting cylinder 86 to drop to atmospheric pressure.

The venting of the back sides of the pistons 91 causes a separation between the auxiliary finger contacts 103 and the annular contacting portion 104 associated with the stationary contacts 94. Meanwhile the movable contacts 93 remain in engagement with the stationary contacts 94 because of the utilization of compression springs 105 interposed between the movable contacts 93 and the pistons 91. Following a predetermined separating movement of the auxiliary contacts 103 from the stationary contacts 104, the movable contacts 93 are separated from the stationary contacts 94 to establish two serially related arcs between the two pair of contacts 93, 94. One terminal of each of these arcs will fasten to the arcing contacts 95, 96 so that the established arcs will extend longitudinally through the orifice 94 and will be subjected therein to a longitudinal flow of compressed gas passing from the region within the tank 1 through the orifice 94 to be forced out of the venting means 101 associated with the bushing 4. The result is an extinction of the two serially related arcs.

Meanwhile the lowering of pressure within the inner venting cylinder 86 causes the high pressure gas within the region 106 to pass through the conduit 107 to the right-hand face of the piston 81 associated with the second valve means 80 to thereby cause leftward movement of the piston 81 to thus permit the sleeve valve 83 to close port 108. Since the region 106 is at high pressure and the region 109 is now at low pressure, the annular piston 74 will move to the left thus separating the disconnect contacts 77, 78, this separation taking place after the interruption of the arcs drawn by the movable contacts 93 and the stationary contacts 94.

Meanwhile the piston 81 associated with the first valve means 79 remains stationary, inasmuch as the region 110 to the left of the piston 81 is at a low or atmospheric pressure.

When the annular piston 74 completes its opening movement it will pick up the flange 111, integrally formed with the sleeve valve 87, forcing the sleeve valve 87 to the left, thus closing port 112. However, the port 108 remains closed because of the sleeve valve 83 which remains in its leftward position until the pressure within the region 102 rises to a value approaching the pressure of the gas within the region 106 which is at a pressure the same as the pressure of the gas in the region 113 exteriorly of the disconnect cylinder 73.

Following interruption of the circuit and opening of the disconnect contacts 77, 78, the coil 50 (shown in Fig. 1) is deenergized to thereby permit the sleeve armature 57 to move up, closing the pilot valve 58, and permit the valve 62 to close. High pressure gas then leaks through the conduits 65 to raise the pressure within the conduits 88, 89 and region 102 within the inner venting cylinder 86. When the pressure has raised to a value approaching the pressure within the region 113, the contacts will close and the second valve means 80 will move back to its open position as shown in Fig. 2. In the positioning of the parts, as they are then, following an opening operation, the annular piston 74 is at the left-hand end of the disconnect cylinder 73, and the sleeve valve 87 is moved to the left, closing the port 112 and both the first and second valve means are open as they are shown in Fig. 2.

In other words, following an opening operation the positions of the sleeve valve 87 and annular piston 74 are merely reversed as they are shown in Fig. 2. When it is desired to close the circuit passing through the interrupter, the coil 50 is again energized to cause downward movement of the sleeve armature 57 and opening of the pilot valve 58. This opens the valve 62 to permit opening of the contact structure associated with the units 67 and closing of the disconnect means 21 in a manner identical to the opening operation thereof, except that the movements take place in exactly the opposite manner as they did during the opening operation, that is, the first valve means 79 moving to the right and the second valve means 80 remaining stationary. During the opening operation it will be recalled that the first valve means 79 remain stationary and the second valve means 80 moved to the left.

If desired, resilient packing material 114 may be associated with the blast valves 92 to insure that no high pressure gas within the tank 1 will pass through the orifices 94 to the region 63 which is always at atmospheric pressure. As in Fig. 1, metal wool 19 may be provided within the conduit 97 to facilitate deionization of the arcing gases.

It will be observed that in the construction shown in Fig. 2 there are improvements to the construction shown in Fig. 1. First, means are shown whereby two or more interrupting units 67 may be associated with the interior end of the bushing 4. Secondly, the second bushing 14, utilized in Fig. 1 for venting the arcing gases to atmosphere, has been eliminated, the gases in Fig. 2 being vented through the hollow bushing 4 itself. Thirdly, the hollow bushing 4 serves to house the trip armatures, as in the construction shown in Fig. 1, but these armatures have been made in the form of thin-walled tubes so that the central space is still available for discharge of arc gases, and for discharging gas from the back sides of the operating pistons 91. The armatures need not necessarily be tubular but may be solid provided they occupy only a small fraction of the area of the hollow bushing 4. As in the construction shown in Fig. 1, the trip armatures are operated by means of a coil surrounding the bushing 4 at ground potential.

It will be noted that the trip armature in this breaker actuates only a small pilot valve and hence requires very little force. The operation of this pilot valve sets in motion a relatively large air piston operated valve which opens a large port to vent the back sides of the blast valve pistons 91. Hence, sudden venting is achieved, and the blast valves open quickly after the trip impulse. The piston operated disconnect switch may be attached at the bottom of each pole interrupter stack to retract a disconnect blade 77, which in the closed position meets a similar disconnect blade 78 located on the opposite bushing. The disconnect piston 74 is operated by venting its back side to atmosphere simultaneously with the blast pistons 91, but opening later than the interrupter contacts 93, 94 because of the restriction 115 provided in the discharge conduit 88 and the restriction offered by vent 117 on the high pressure side.

The restriction 115 was provided to guarantee that regions 102, 109 (with the valves as shown in Fig. 2) would remain at substantially equal pressure, i. e., that on opening of valve 62 the main pressure drop would occur at 115 rather than at 112. If this were not the case, there would be a differential pressure on piston 81 of the first valve means 79 that would cause it to move to the right, which is not desirable.

However, the disconnect structure 21 of Fig. 2 may, if desired, be operated by a separate air source than the contacts as shown in Fig. 1. This has the disadvantage of generally requiring an additional insulating support for the disconnect means but gives independent control of the disconnect contacts 77, 78.

It will be noted that if during the opening operation the second valve means were not provided to close the port 108 following leftward movement of the sleeve valve 87, that the region 106 to the right of the piston 74 would drop to atmospheric pressure thereby causing an immediate closure of the disconnect contacts during an opening operation. Consequently, during the opening operation it is necessary to close the port 108 thus maintaining the region 106 at high pressure thereby preventing rightward movement of the piston 74 near the end of the opening operation of the disconnect structure 21. Correspondingly, during a closing operation it is necessary to provide means for closing the port 112 following rightward movement of the sleeve valve 87 to thereby prevent the region 109 from dropping to atmospheric pressure. If this occurred, the piston 74 would be immediately retracted during such a closing operation which, of course, is not desirable. The conduits 107, associated with the first and second valve means, are provided so that the pressure to the back sides of the pistons 81 is the same as the pressure at the extremities of the disconnect cylinder 73. The apertures 116, 117 are of sufficient size that they permit high pressure gas to quickly enter the region 106, 109 without, however, being of a size comparable with the ports 108, 112.

An additional feature that may be incorporated in this improved arrangement of the breaker, as shown in Fig. 2, is means for keeping the interrupter contacts closed while the disconnect switch moves from open to closed position, but permitting both disconnect and interrupter contacts to open simultaneously when the disconnect moves from closed to open position. One method of accomplishing this arrangement is shown in Fig. 3. In this arrangement a conduit 119 connects the valve 62 (not shown) directly to the inner venting cylinder 86. The construction of the disconnect means 21 is the same as that described in connection with Fig. 2. A venting conduit 120 is provided which directly interconnects the back sides of the pistons 91 with the left-hand end of the disconnect cylinder 73. Consequently, during an opening operation when the region 109 within the disconnect cylinder 73 is at a low or atmospheric pressure, both the interrupting units 67 and the disconnect means 21 are simultaneously operated. During the closing operation when the region 109 to the left of the piston 74 (not shown) is at high pressure, the venting conduit 120 will then transmit high pressure to the back sides of the pistons 91 to maintain the arcing contacts closed during such a closing operation of the interrupter. Thus, during a closing operation, the units 67 remain closed and only the disconnect means 21 moves from open to closed position.

An advantage of the arrangement shown in Fig. 4 over that of Fig. 3 is immediate opening in the case of closing in on a short circuit. In other words, while the breaker is in the open position, overload conditions may exist in the circuit controlled by the interrupter, whereby closure of the interrupter causes an overload current to pass through the interrupter.

To eliminate time delay and to provide immediate opening when closing in on a short circuit an arrangement as shown in Fig. 4 may be provided. In this figure a current responsive means, generally designated by the reference numeral 121, and in this instance comprising a solenoid 122 connected serially into the breaker circuit is provided to cause an opening of the first valve means 79 when closing in on a short circuit. The disposition of the parts shown is a position near the end of a normal closing operation before the pressure has risen in region 102 to permit retraction of the first valve means 79. It will be remembered that during a closing operation of the disconnect means 21 the region 109 is at high pressure. Consequently, this high pressure in the region 109 passes through the conduit 107 to the back side of the piston 81. Since low pressure exists in the region 102, the first valve means 79 would be moved to the right by the differential pressure existing on the opposite sides of the piston 81 against the biasing action exerted by the compression spring 84. Consequently, under normal conditions it would be necessary for the pressure in the region 102 to rise to a pressure equal to that existing in region 109 before the compression spring 84 could open the first valve means 79, thereby opening the port 112.

However, in closing in on a short circuit this time lag is not desirable. Consequently, when the disconnect contacts engage to complete the circuit through the interrupter and the sleeve valve 87 is moved to the right, as viewed in Fig. 4, the overload current passing through the interrupter, and hence through the solenoid 122, moves the armature 123 to the left, picking up the insulating rod 130 and opening the first valve means 79, thereby causing the sleeve valve 83 to move to the left uncovering port 112. This permits the pressure within region 109 to rapidly drop to atmospheric pressure thereby opening the interrupter contacts and immediately causing a leftward motion of the disconnect piston 74, the port 108 being closed by the sleeve valve 87. When the circuit has been interrupted by the interrupting units 67, the current through the solenoid 122 will cease. Consequently, the latch 125 maintains the movable armature 123 in its leftward position until the piston 74 (not shown) strikes the release rod 126 to unlatch the movable armature 123 when the disconnect contacts 77, 78 are in their fully open circuit position. As in Fig. 3, the conduit 119 leads to the valve 62 whereas the venting conduit 120 leads to the interrupters 67, venting the back sides of the pistons 91 (Fig. 2).

In Fig. 5, the venting conduit 120 communicates with the conduit 119, said communication being controlled by a fourth valve means, generally designated by the reference numeral 127. A current responsive means 121, as previously described in Fig. 4, is provided. The fourth valve means comprises a valve 128 connected directly to the sleeve valve 87, and a sleeve valve 129 which is responsive to motion of the sleeve valve 83 of the first valve means 79. The disposition of the parts is such that the breaker has just been closed on a circuit which does not involve overload conditions, in which case the solenoid 122, which is in series circuit, does not set up sufficient flux to move the movable armature 123 to the left.

Should, however, the breaker, fragmentarily shown in Fig. 5, be closed in on a short circuit, the overload current passing through the solenoid 122 would generate sufficient flux to move the movable armature 123 to the left picking up the rod 130 and opening both the first valve means 79 and the fourth valve means 127. This will cause a venting of the back sides of the pistons 91 of the interrupters 67 through the venting conduit 120. Also the region 109 will drop to atmospheric pressure by an opening of the first valve means 79 to permit an immediate opening operation of the piston 74.

As in Fig. 4, the latch 125 is provided to maintain the movable armature 123 in its leftward position following deenergization of the solenoid 122. When the piston 74 nears its opening stroke, it engages the release rod 126 to unlatch the movable armature 123.

The advantage of Fig. 5 over Fig. 4 is that more rapid venting of conduit 120 results since it no longer is in series with space 109. Hence there will be faster opening on a short circuit.

Figs. 6 and 7 show disconnect arrangements similar respectively to Figs. 5 and 4 with the exception that air saver devices are installed so that shortly after opening movement of the disconnect piston 74 the venting will cease through the venting conduits 120 thereby permitting reclosure of the arc extinguishing units 67. It is to be observed that as long as venting takes place through the venting conduit 120, the breaker will remain open to permit blast air to pass out of the breaker. It is desirable to reclose the units 67 following arc extinction, following separation of the disconnect contacts to an extent to prevent restriking across the separated disconnect contacts. However, the disconnect contacts will have been separated a sufficient extent to prevent restriking after they have moved apart a short distance. Consequently, it is desirable to cease venting through the venting conduits 120 to permit reclosure of the interrupting units 67 shortly after the opening movement of the disconnect piston 74.

In Fig. 6, which is an arrangement similar to Fig. 5, the fourth valve means 127 has the valve 128 connected by a rod 130 which slidably passes through the disconnect piston 74. A compression spring 131 seats at its left-hand end against a washer 132 fixed to the rod 130. The right-hand end of the compression spring 131 rests against a washer 133 slidable on the rod 130.

Consequently, shortly after a predetermined opening motion of the disconnect piston 74, the latter sliding on the rod 130, the piston 74 will strike the slidable washer 133 compressing the spring 131 to cause closing of the valve 128 over aperture 134, which prevents communication between the venting conduit 120 and the conduit 119 leading to valve 62 (Fig. 2). The current responsive means 121 and the latch device 125 operate as previously described in connection with Figs. 4 and 5. A notch 135 is provided at the right-hand end of rod 130 cooperating with a bracket 136 so that once the rod 130 has moved to the left, it will remain there in its closed position until during a subsequent closing operation the piston 74 strikes the flange 137, rigidly secured to the rod 130. Consequently, the notch 135 and bracket 136 cooperate with the flange 137 so that the rod 130, and hence valve 128, are either positively moved in the open or closed directions to remain in either one position or the other.

Fig. 7 shows an arrangement similar to Fig. 4 except that a third valve means 138 is provided controlling the venting conduit 120. The third valve means 138 comprises a valve 139 operated by a rod 140 slidably passing through the piston 74 and having a head 141 at its right-hand end. Following a predetermined opening motion of the disconnect piston 74, the piston 74 strikes the slidable washer 133 on the rod 140 compressing the spring 131 to cause closing of the valve 139, thereby permitting the contact structure within the interrupting units 67 to close. The valve 139 once closed, remains closed until the piston 74, sliding on the rod 140 during the closing stroke, engages the head 141 on rod 140 causing opening of the valve 139.

Fig. 8 shows an arrangement which may be employed in a bushing leading into a transformer within which is stored compressed gas for maintaining a high dielectric strength in the transformer housing. In Fig. 8, a novel contact structure is shown comprising an interrupting unit 67 operating in a manner similar to the operation of the interrupter 67 described in Fig 2, the venting of the back side of the piston 91 being controlled directly by the valve 142 secured to a rod 143, the latter being operated by a movable sleeve armature 144.

The operation is apparent from the description of the operation of the breaker shown in Fig. 2. In other words, upon energization of the coil 50, the movable armature 144 moves downwardly to cause opening movement of the valve 142 against the biasing action exerted by a leaf spring 145 to permit venting on the rear side of the piston 91. The downward movement of the piston 91 first causes opening of the blast valve 92 separating the auxiliary contact structure and finally after operation of the lost-motion mechanical connection 31, the movable contact 93 separates from the orifice-like stationary contact 94 to draw an arc which is quickly extinguished by a blast of gas passing through the bushing 4. A terminal lug 146 may be provided at the lower end of a conducting plate 147, threadedly secured at 148 to the lower end of an insulating cylinder 149 which guides the reciprocating motion of the piston 91. Vents 150 provided through the walls of the cylinder 149 permit gas under pressure to pass through the orifice 94 extinguishing the arc drawn between the contacts 93, 94.

Fig. 9 shows a tank 151 of metal or other material at ground potential and generally elongated in shape having secured thereto at its ends, bushings 152, 153. The bushing 152 is shown more clearly in Fig. 11. The bushing 153 is shown more clearly in Fig. 10.

Referring to Fig. 10, it will be observed that the bushing 153 contains a disconnect means 21 of the type shown in Fig. 2 but in this instance being enclosed within a conducting sleeve 154, a groove 155 being provided in the wall of the disconnect cylinder 73 to permit high pressure gas communication to the apertures 116, 117 from the region 156 disposed within the tank 151. The construction of the disconnect means 21 is identical to the construction shown in Fig. 2. The conduit 88 of Fig. 2 is analogous to the sleeve 157 composed of conducting material of Fig. 10. The sleeve 157 has an aperture 158 controlled by valve 159 biased closed by a tension spring 160. Energization of the coil 161 disposed within the grounded tank 151 causes downward movement of the movable sleeve armature 57 and hence opening movement of the valve 159. This permits venting to take place through the sleeve 157 which is analogous to the conduit 88 of Fig. 2.

Consequently, Fig. 10 shows a disconnect structure disposed within a bushing extending through the wall of a pressurized chamber and controlled by a coil surrounding the bushing at ground potential.

Figure 11:
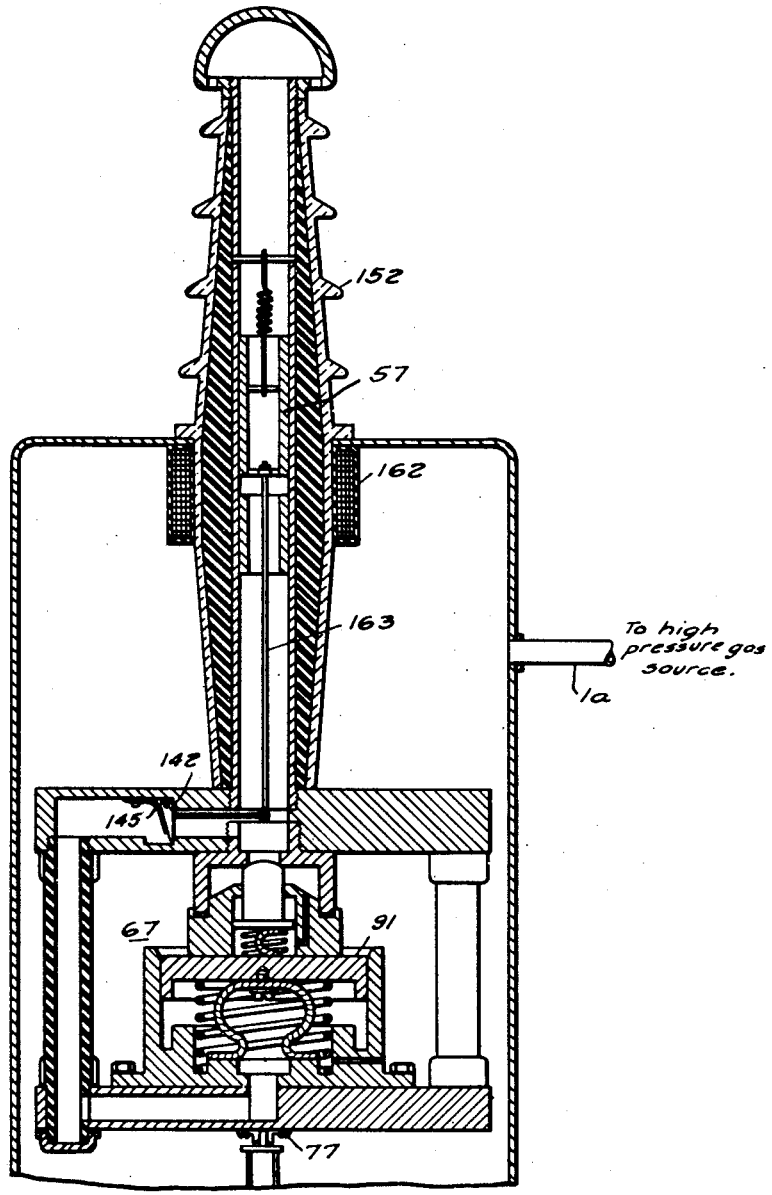
Fig. 11 is a vertical sectional view through the other bushing of Fig. 9 showing the interrupting structure associated therewith, the contacts being in the closed circuit position.

Referring to Fig. 11, which shows the bushing 152 more clearly than Fig. 9, it will be observed that a single interrupting unit 67 is shown being controlled by a valve structure similar to that shown in Fig. 8. Energization of the coil 162 will cause downward movement of the sleeve armature 57, and hence downward movement of the rod 163, thereby causing opening movement of the valve 142 to permit venting to take place on the back sides of the piston 91 of the interrupting structure 67. The operation of the interrupting structure is as described in Fig. 2; consequently, further description thereof appears unnecessary to an understanding of this embodiment of my invention.

Fig. 12 shows a modified type of bushing 4 within which is disposed both a disconnect means 21 and an interrupting unit 67. A valve 164, operated by a rod 165, controls the venting through an insulating conduit 166 which permits a venting to the rear of the piston 91 and into the interior of the disconnect means 21 which may be identical to that previously described in connection with Fig. 2. Consequently, two bushings of the type shown in Fig. 8 and Fig. 12 may be used together to control the circuit through a transformer contained in a housing filled with gas under pressure.

From the foregoing description it will be apparent that I have provided novel arrangements for providing interrupting structures utilized in conjunction with chambers containing gas under pressure. It is apparent that the disconnecting structures which I have disclosed are simple in operation and therefore effective and dependable. The high pressure gas is close to the interrupting orifice so that there is no time delay in effecting interruption of the arc. Such an interrupting structure may not only be used by itself independently but it may also be used to effect the control of various structures, such for instance as transformers contained in housings enclosing gas under pressure.

Although I have shown and described specific structures, it is to be clearly understood that the same were merely for the purpose of illustration and that changes and modifications may be made therein by those skilled in the art without departing from the spirit and scope of the appended claims.

I claim as my invention:

1. In a circuit interrupter of the gas-blast type, means defining a chamber filled with a gas under pressure, means defining an outlet through a wall of the chamber and carrying a stationary orifice-type contact at its inner end, a bushing extending into the chamber carrying a piston chamber at its interior end, a blast valve, a piston movable within the piston chamber and carrying the blast valve, a movable contact cooperable with the orifice-type stationary contact to draw an arc, a lost-motion mechanical connection interconnecting the movable contact and the blast valve, disconnect means disposed within the chamber and serially related to said arcing contacts, piston means for actuating the disconnect means, and independent conduit means extending through the wall of the chamber to transmit gas for actuating the piston means.

2. In a circuit interrupter of the gas-blast type, means defining a chamber filled with a gas under pressure, a bushing extending through a wall of the chamber and carrying two serially related arc extinguishing units at its interior end, and electromagnetic means disposed within the bushing for simultaneously causing the operation of both arc extinguishing units.

3. In a circuit interrupter of the gas-blast type, means defining a chamber filled with a gas under pressure, a bushing extending through a wall of the chamber and carrying two serially related arc extinguishing units at its interior end, electromagnetic means disposed within the bushing for simultaneously causing the operation of both arc extinguishing units, disconnect means associated with the two units, and venting means extending through the bushing for actuating both units and the disconnect means.

4. In a circuit interrupter, means defining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extinguishing unit, the venting conduit interconnecting the arc extinguishing unit with one end of the disconnect cylinder.

5. In a circuit interrupter of the gas-blast type, means defining a chamber filled with a gas under pressure, two bushings extending into the chamber both having venting passages therethrough, two serially related arc extinguishing units associated with one bushing, and disconnect means associated with the other bushing.

6. In a circuit interrupter, means defining a chamber filled with a gas under pressure, a bushing extending through a wall of the chamber, electromagnetically actuated valve means disposed within the bushing, an arc extinguishing unit disposed within the bushing, and a disconnect device also disposed within the bushing, both the arc extinguishing device and the disconnect device being operated by an actuation of the electromagnetically actuated valve.

7. In a circuit interrupter, means defining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extinguishing unit, the venting conduit interconnecting the arc extinguishing unit with one end of the disconnect cylinder, and current responsive means for causing an actuation of the first valve means when closing on a short circuit.

8. In a circuit interrupter, means definining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extinguishing unit, the venting conduit interconnecting the arc extinguishing unit with one end of the disconnect cylinder, a current responsive means for causing an actuation of the first valve means when closing on a short circuit, a third valve means for controlling the venting conduit, and means arranged to close the third valve means shortly after an opening movement of the piston.

9. In a circuit interrupter, means defining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extingushing unit, the venting conduit communicating with the conduit, fourth valve means for controlling the venting conduit, and means interconnecting the fourth valve means with the sleeve valve.

10. In a circuit interrupter, means defining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extinguishing unit, the venting conduit communicating with the conduit, fourth valve means for controlling the venting conduit, means interconnecting the fourth valve means with the sleeve valve, and current responsive means for opening the first valve means when closing on a short circuit.

11. In a circuit interrupter, means defining a chamber filled with a gas under pressure, a bushing extending through a wall of the chamber, an arc extinguishing unit positioned adjacent the interior end of the bushing, a disconnect cylinder, a piston carrying a disconnect contact movable within the disconnect cylinder, an inner venting cylinder, a sleeve valve surrounding the inner venting cylinder, first and second valve means disposed at opposite ends of the disconnect cylinder, venting means extending through the bushing, a conduit connecting the venting means with the inner venting cylinder, a venting conduit for actuating the arc extinguishing unit, the venting conduit communicating with the conduit, fourth valve means for controlling the venting conduit, means interconnecting the fourth valve means with the sleeve valve, current responsive means for opening the first valve means when closing on a short circuit, and means for closing the fourth valve means shortly after opening movement of the piston.

12. In a circuit interrupter of the gas-blast type, means defining a chamber filled with a gas under pressure, a bushing extending through a wall of the chamber and carrying an arc extinguishing unit adjacent its interior end, the unit comprising a piston carrying a blast valve, a valve for venting the back side of the piston, and a movable sleeve armature disposed within the bushing for actuating the valve.

13. In a circuit interrupter, an insulator, conduit means, the conduit means having a portion formed helically within the insulator.

14. In a circuit interrupter, conduit means, the conduit means comprising one or more helically formed tubes, and supporting means for the one or more tubes.

15. In a circuit interrupter of the gas-blast type, a casing filled with gas under pressure, a bushing extending into said casing and having an exhaust passage extending therethrough, separable contact means supported adjacent the inner end of said bushing, said contact means including means for directing a blast of gas therethrough to extinguish an arc, a blast valve for controlling the flow of gas from said casing through said contact means and said exhaust passage, and electromagnetic means including a movable sleeve member within said bushing for actuating said blast valve.

16. In a circuit interrupter of the gas-blast type, a casing filled with gas under pressure, a bushing extending into said casing and having an exhaust passage extending therethrough, disconnect means disposed within said casing comprising a disconnect operating cylinder, a piston carrying a disconnect contact and movable within said cylinder, an inner venting cylinder within said disconnect operating cylinder, a conduit interconnecting said venting cylinder and said exhaust passage, and valve means for controlling the flow of gas from said disconnect operating cylinder to said venting cylinder to effect opening and closing movement of said disconnect contact.

17. In a circuit interrupter, means defining a chamber containing gas under pressure, a stationary orifice-type contact disposed in said chamber, a cooperating movable contact, a terminal bushing extending into said chamber, a cylinder rigidly mounted on the inner end of said bushing, a piston reciprocably movable in said cylinder, a blast valve integral with said piston surrounding and supporting said movable contact, a lost motion connection between said blast valve and said movable contact, said piston being operable to first open the blast valve and to then move said movable contact to draw an arc.

18. In a circuit interrupter, means defining a chamber containing gas under pressure, a stationary orifice-type contact disposed in said chamber, a cooperating movable contact, a terminal bushing extending into said chamber, a cylinder mounted on the inner end of said bushing, a piston movable in said cylinder, a blast valve surrounding said movable contact and integral with said piston, a lost-motion connection between said blast valve and said movable contact, said piston being operable to first open said blast valve and to then actuate said movable contact to draw an arc, a valve operable to effect operation of said piston, and electromagnetic means for actuating said valve.

ALBERT P. STROM.

REFERENCES CITED

The following references are of record in the file of this patent:

UNITED STATES PATENTS

| Number | Name | Date |
|---|---|---|
| 1,904,577 | Uebermuth | Apr. 18, 1933 |
| 1,977,716 | Cruise | Oct. 23, 1934 |
| 2,108,560 | Kesselring | Feb. 15, 1938 |
| 2,153,400 | Trencham | Apr. 4, 1939 |
| 2,260,188 | Milliken | Oct. 21, 1941 |
| 2,292,252 | Thommen | Aug. 4, 1942 |

FOREIGN PATENTS

| Number | Country | Date |
|---|---|---|
| 317,481 | Great Britain | Sept. 4, 1930 |
| 512,400 | Great Britain | Sept. 1, 1939 |
| 701,867 | Germany | Jan. 25, 1941 |